E. G. SIMPSON.
PILLAR HARDWARE.
APPLICATION FILED FEB. 12, 1917.
1,246,482.
Patented Nov. 13, 1917.
2 SHEETS—SHEET 1.
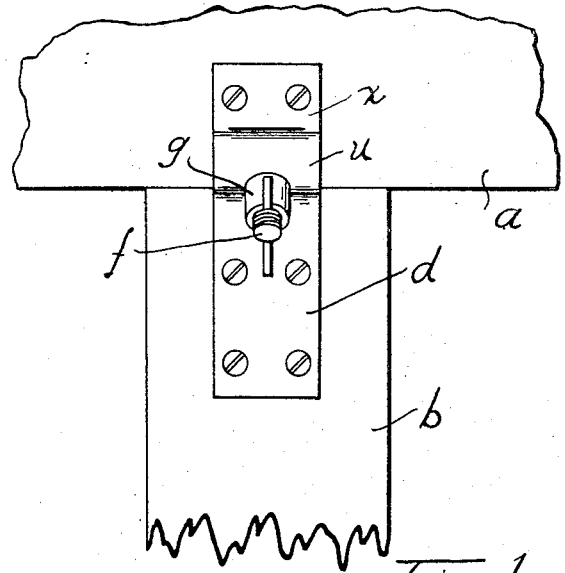
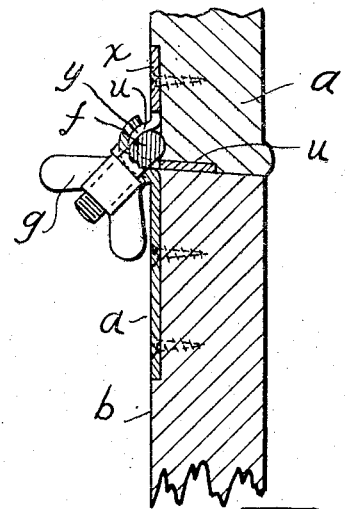
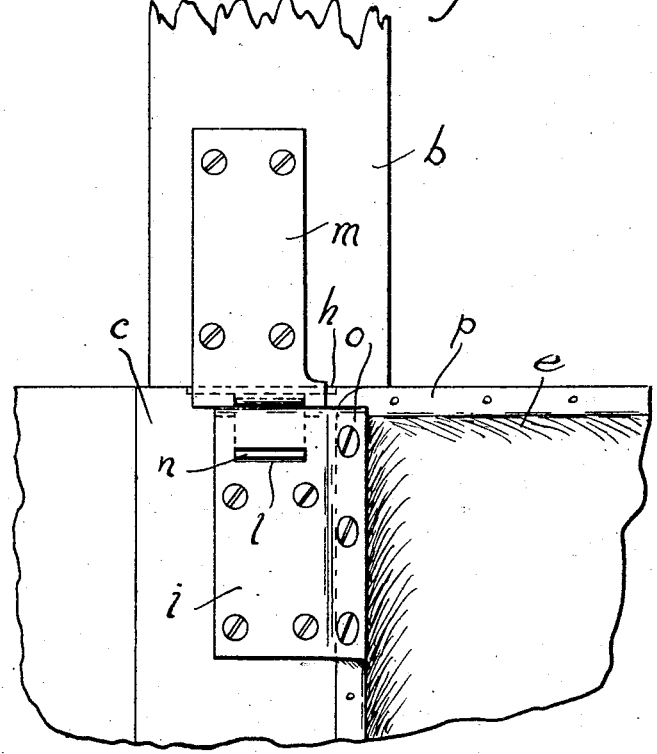
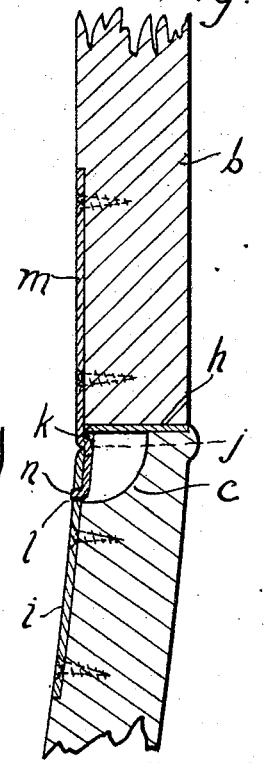
Fig. 1
Fig. 2
INVENTOR
Emory Glenn Simpson
BY Ralzemond A. Parker
ATTORNEY

E. G. SIMPSON.
PILLAR HARDWARE.
APPLICATION FILED FEB. 12, 1917.

1,246,482.

Patented Nov. 13, 1917.
2 SHEETS—SHEET 2.

INVENTOR
Emory Glenn Simpson

By Ralzemond A. Parker ATTORNEY

UNITED STATES PATENT OFFICE.

EMORY GLENN SIMPSON, OF DETROIT, MICHIGAN, ASSIGNOR TO FISHER BODY CORPORATION, OF DETROIT, MICHIGAN, A CORPORATION OF NEW YORK.

PILLAR HARDWARE.

1,246,482.  Specification of Letters Patent.  Patented Nov. 13, 1917.

Application filed February 12, 1917. Serial No. 147,979.

*To all whom it may concern:*

Be it known that I, EMORY GLENN SIMPSON, a citizen of the United States, residing at Detroit, county of Wayne, State of Michigan, have invented a certain new and useful Improvement in Pillar Hardware, and declare the following to be a full, clear, and exact description of the same, such as will enable others skilled in the art to which it pertains to make and use the same, reference being had to the accompanying drawings, which form a part of this specification.

This invention relates to pillar hardware for securing in place the pillars of a convertible automobile body.

In the drawings,—

Figure 1 is a view of a fragment of the inside of the automobile body.

Fig. 2 is a vertical section of the same.

$a$ is the roof; $b$ the removable pillar, and $c$ the door post, while $e$ designates the door of a closed automobile body. It has now been found desirable to make pillars removable or foldable so that the body can be converted from a closed car into an open car by simply dropping the windows into the window wells and by removing or folding back the pillars.

The success of a body of this type lies chiefly in the character of the devices for holding the pillars in place for if they allow the pillars to rattle the conveniences gained by convertibility are largely offset by the annoyances of rattling.

The object of the present invention is to afford a separable securing device between the pillar and the body and a tension and binding device between the pillar and the roof.

Figure 3:
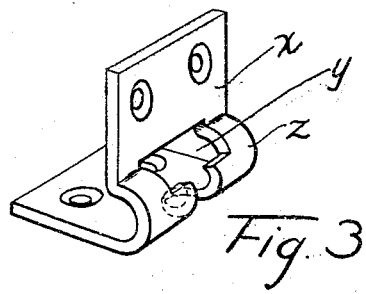
Fig. 3 is a detail in perspective of a portion of the lock used at the top of the pillar.
Figure 4:
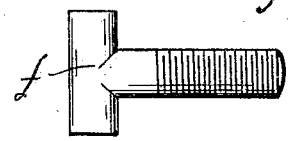
Fig. 4 is a detail of the bolt used in this lock.

A further object is to so construct these devices that they can be made as stampings instead of castings, and thereby greatly lessen the cost. To this end the locking device at the top comprises an angle iron $x$ (Fig. 3) provided with a semi-circular offset $z$ at the angle. The two straight webs of the angle iron can be secured to the roof quarter, the lower web forming also a metal lining for the pillar seat $u$.

The portion of the lock secured to the top of the pillar has a straight strap $d$ having at its upper end a C-like extension designed to fit over the semi-circular offset $z$ of the angle iron. It is also provided with a slot. It will be seen from Fig. 3 that the semi-circular offset $z$ is provided with a T-slot $y$ through which the head of the T-bolt $f$ may be dropped when the wing nut $g$ is run out on the bolt far enough to give the bolt the necessary projection.

Figure 5:
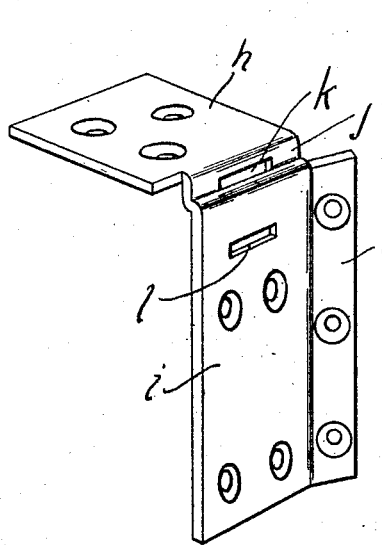
Fig. 5 is a perspective in detail of the fixture that attaches to the top of the door post.
Figure 6:
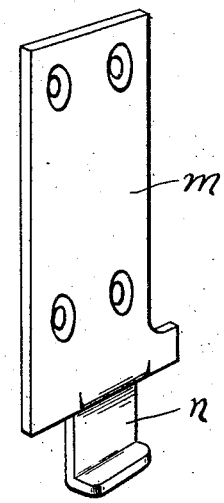
Fig. 6 is a perspective in detail of the fixture that attaches to the bottom of the pillar.

The securing device at the bottom comprises an angle iron (Fig. 5) provided with a web $h$ that forms a lining for the bottom pillar seat and a web $i$ adapted to be fastened to the side of the door post. At the angle is a jog $j$ which moves the main part of the web $i$ one thickness farther out than the first fold of the metal would give. In this jog is a slot $k$ and in the main portion of the web lower down is a slot $l$.

Attached to the lower end of the pillar is a strap $m$ provided with an offset extension or hook $n$.

Now it is evident that with the locking and binding devices released the pillar $b$ can be tipped down to nearly a horizontal position, moving the hooked end out of the two slots $k$ and $l$, thereby making the pillars completely removable. The web $i$ is provided with an angular wing $o$ which fits over the nailing strip $p$ and the screws which pass through the apertures in this wing serve to keep the nailing strip to the body at this location.

From the above description it will be seen that all this hardware with the exception of the bolt and wing nut can easily be made by stamping, thereby making it relatively cheap.

What I claim is:

1. In pillar hardware for the purpose specified, the combination of an angle iron having at the angle a jog provided with a slot, the lower web of the angle iron being provided also with a recess, and a strap securable to the lower portion of the pillar and provided with a hook-like portion adapted to be passed through the slot and engage in the recess.

2. In pillar hardware for the purpose specified, the combination of a stamped angle plate having adjacent the angle a slot and the lower web of the angle plate being provided with a slot and a strap securable to the lower portion of the pillar and provided with a lower off-set portion to form a hook, the end of the hook returning to substantially the plane of the main part of the strap, the said hook-like end being adapted to pass through the slot at the angle of the plate and engage in the slot in the web of the plate.

In testimony whereof I sign this specification.

EMORY GLENN SIMPSON.